US008882027B2

(12) United States Patent
Chemin et al.

(10) Patent No.: US 8,882,027 B2
(45) Date of Patent: Nov. 11, 2014

(54) AIRCRAFT POWER PLANT, AN AIRCRAFT, AND A METHOD OF USING A PISTON ENGINE IN A POWER PLANT HAVING A CONVENTIONAL GEARBOX

(75) Inventors: Jérôme Chemin, Tullins (FR); Thomas Manfredotti, La Colle sur Loup (FR); Christian Mercier, La Fare les Oliviers (FR)

(73) Assignee: Airbus Helicopters, Marignane Cedex (FR)

( * ) Notice: Subject to any disclaimer, the term of this patent is extended or adjusted under 35 U.S.C. 154(b) by 196 days.

(21) Appl. No.: 13/111,177

(22) Filed: May 19, 2011

(65) Prior Publication Data

US 2011/0290200 A1    Dec. 1, 2011

(30) Foreign Application Priority Data

May 31, 2010 (FR) ...................... 10 02282

(51) Int. Cl.
| | | |
|---|---|---|
| *B64D 27/04* | (2006.01) | |
| *B64D 35/02* | (2006.01) | |
| *B64D 27/00* | (2006.01) | |
| *B64C 27/14* | (2006.01) | |

(52) U.S. Cl.
CPC ............... *B64D 35/02* (2013.01); *B64D 27/00* (2013.01); *B64C 27/14* (2013.01); *B64D 27/04* (2013.01)
USPC ............................................. 244/55; 244/60

(58) Field of Classification Search
CPC ........ B64D 35/00; B64D 35/02; B64D 27/00; B64D 27/04; B64D 27/08; B64D 27/06
USPC ............................................. 123/2; 244/60, 55
See application file for complete search history.

(56) References Cited

U.S. PATENT DOCUMENTS

| 1,503,356 | A | * | 7/1924 | Elliott | ......................... 74/421 R |
| 2002/0145076 | A1 | * | 10/2002 | Alford | .............................. 244/60 |
| 2003/0089822 | A1 | * | 5/2003 | Koch et al. | ....................... 244/60 |

FOREIGN PATENT DOCUMENTS

| GB | 358789 A | 10/1931 |
| WO | 0190545 A1 | 11/2001 |

OTHER PUBLICATIONS

The Delta D2—Australia's Diesel Helicopter by Dennis Raubenheimer May 2009.

* cited by examiner

*Primary Examiner* — Lindsay Low
*Assistant Examiner* — Jacob Amick
(74) *Attorney, Agent, or Firm* — Brooks Kushman P.C.

(57) ABSTRACT

The present invention relates to a power plant (10) having a piston engine (30) driving a conventional gearbox (20) dimensioned for a turbine engine, said piston engine (30) comprising a first row (31) of pistons (33) presenting an angle ($\alpha$) relative to a second row (32) of pistons (33). The power plant includes a flywheel (50) and a torsion shaft (40) set into motion by said pistons (33), said torsion shaft (40) being arranged between the first and second rows (31, 32) of pistons.

10 Claims, 1 Drawing Sheet

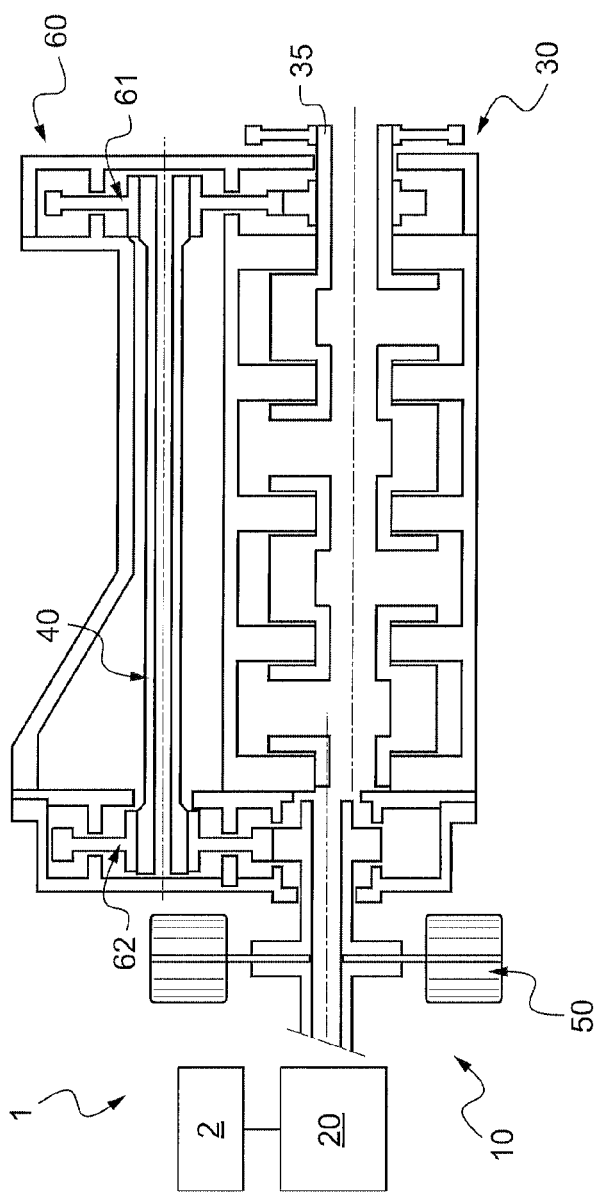
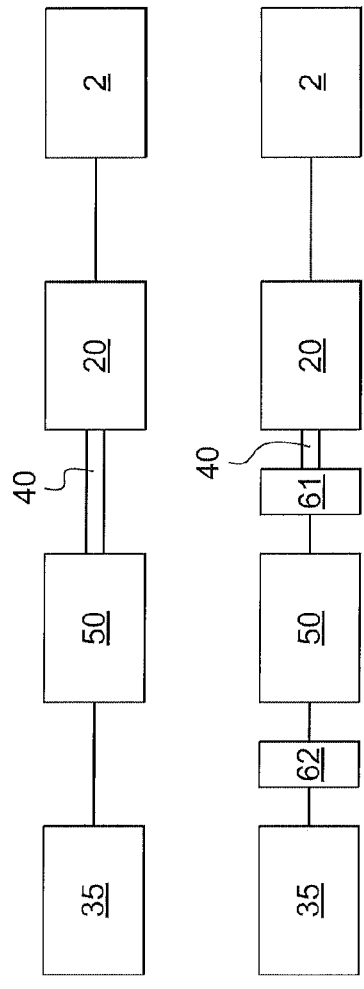
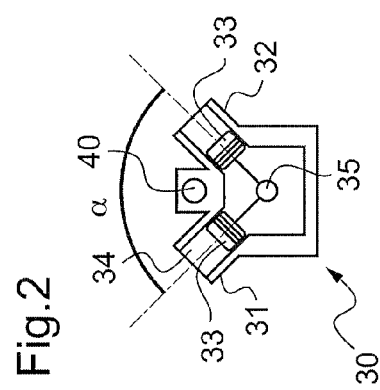

AIRCRAFT POWER PLANT, AN AIRCRAFT, AND A METHOD OF USING A PISTON ENGINE IN A POWER PLANT HAVING A CONVENTIONAL GEARBOX

CROSS REFERENCE TO RELATED APPLICATIONS

This application claims the benefit of FR 10 02282 filed on May 31, 2010, the disclosure of which is incorporated in its entirety by reference herein.

BACKGROUND OF THE INVENTION (1) Field of the Invention

The present invention relates to an aircraft power plant, to an aircraft, and more particularly to a rotorcraft fitted with a power plant, and to a method of using a piston engine in a power plant having a conventional gearbox that is not designed for such a piston engine.

(2) Description of Related Art

In particular, the invention lies in the field of means for imparting rotary drive to a rotor fitted to the rotorcraft by using a piston engine, in particular a diesel engine. More precisely, the invention relates to a mechanism for attenuating the mechanical torque pulsations between such an engine and a conventional rotor gearbox that is not designed to be subjected to such torque pulsations.

Rotorcraft are generally fitted with at least one rotor that is driven by a power plant having a turbine engine and a power gearbox, said power gearbox being interposed between the turbine engine and the rotor. It should be observed that in the text below, the term "conventional" gearbox is used to designate a power gearbox that is adapted for coupling to a turbine engine.

However, e.g. for ecological reasons, it may be envisaged to make use not of a turbine engine, but rather of a piston engine. Although attractive, such a power plant appears a priori to require a power gearbox to be redesigned so as to be dedicated to a piston engine. Unlike a turbine engine, a piston engine generates torque pulsations that are liable to damage a conventional gearbox, since, by definition, such a gearbox is not designed to withstand such torque pulsations.

Furthermore, those torque pulsations are particularly large in the specific field of rotorcraft, because of the weight of such aircraft that needs to be compensated in order for them to take off and/or travel. More particularly, diesel engines may be used for driving rotors, but by their very architecture they generate very high levels of torque pulsations. The self-ignition of fuel in the combustion chamber gives rise to a sudden rise in pressure that induces instantaneous peaks of torque with a spectral response that presents high levels of harmonics up to high orders. Such torque pulsations, as conveyed by the mechanical transmission system between an engine and a rotor, can give rise to breakage due to fatigue in the members making up the transmission system, and in particular in the members of a conventional gearbox.

In order to damp such torque pulsations, a first solution consists in interposing a flywheel between a drive shaft and a driven shaft, the flywheel presenting a large amount of inertia in order to damp the torque pulsations. Such a solution presents the advantage of being simple to implement, but the drawback of increasing the size and the weight of the transmission system, which is something to be avoided in the field of aircraft such as rotorcraft.

A second solution consists in interposing a torsion mechanism between a drive shaft and a driven shaft. Conventionally, such a mechanism makes use of the twisting ability of one of the shafts, and more particularly of the drive shaft, by imparting a certain amount of flexibility thereto. The torsion shaft serves to absorb torque pulsations by having its resonant mode tuned well below the excitation that gives rise to torque pulsations. Such a solution presents the advantage of being simple to implement, but it makes it necessary to use a shaft of length and/or mass that become unacceptable for using such a shaft in the field of rotorcraft. Such a torsion shaft having twisting capacity suitable for absorbing torque pulsations is sometimes referred to as a "long" shaft by the person skilled in the art, but the term "torsion" shaft is nevertheless used below herein for convenience.

Document GB 358 789 envisages associating a torsion shaft with a clutch.

SUMMARY OF THE INVENTION

An object of the present invention is thus to provide a power plant provided with a piston engine and a conventional gearbox that is not dimensioned in terms of fatigue to withstand the torque pulsations generated by the piston engine, the power plant then being suitable for being used on board rotorcraft that include such conventional gearboxes.

According to the invention, a power plant is provided with a piston engine driving a conventional gearbox dimensioned for a turbine engine, the piston engine having a first row of pistons presenting an angle relative to a second row of pistons. By way of example, the piston engine is an engine having eight cylinders in a V-configuration, i.e. four cylinders contained in the first row and four cylinders contained in the second row.

The power plant is remarkable in that it includes a torsion shaft set into motion by the pistons in order to drive the conventional gearbox, the torsion shaft being arranged between the first and second rows of pistons, for example.

Consequently, the power plant includes transmission members suitable for enabling the piston engine to drive the gearbox. Amongst those members, there is thus a torsion shaft that is arranged in the space between the first and second rows, the torsion shaft being connected to a crank shaft of the piston engine either directly or indirectly.

The torsion shaft is thus dimensioned so as to be contained within a space that is relatively small.

Furthermore, the transmission members include a flywheel.

The prior art tends to make use either of flywheels or of torsion shafts presenting dimensions that are unacceptable.

Nevertheless, the invention goes against those usual techniques by implementing a torsion shaft having dimensions that are minimized in order to be received in the general space occupied by the piston engine, together with a flywheel having dimensions that are optimized.

The torsion shaft filters only a fraction of the torque pulsations generated by the piston engine, the remainder being filtered by the flywheel, the combination of such a flywheel and such a torsion shaft making it possible to obtain a device that is reliable and relatively compact.

It is then possible to use a piston engine on an existing rotorcraft, arranging the piston engine to occupy the place previously occupied by a turbine engine, and without any need to modify the gearbox.

The power plant may comprise one or more of the following characteristics, depending on implementation variants.

For example, the power plant includes adjustment means for adjusting the relative speed of rotation between a first speed of rotation of the torsion shaft and a second speed of rotation of the flywheel. The adjustment means then establish a second speed of rotation that is faster than the first speed of rotation.

By maximizing the second speed of rotation, the effectiveness of the flywheel is increased. Increasing the second speed of rotation then makes it possible to reduce the dimensions and the weight of the flywheel.

Similarly, by minimizing the first speed of rotation, the effectiveness of the torsion shaft is increased. Reducing the first speed of rotation then enables the dimensions and the weight of the torsion shaft to be reduced.

Thus, the adjustment means may comprise a speed reducer arranged upstream from the torsion shaft. The speed reducer may comprise at least two gearwheels for minimizing the speed of the torsion shaft.

The reducer is optionally arranged between a crank shaft of the piston engine and the torsion shaft. For example, the reducer may directly engage both the crank shaft and the torsion shaft, the reducer connecting the torsion shaft mechanically to the crank shaft.

In a variant, the reducer is optionally arranged between the flywheel and the torsion shaft.

Furthermore, the adjustment means may comprise a speed multiplier upstream from the flywheel. Advantageously, the multiplier possesses at least two gearwheels for increasing the second speed of rotation of the flywheel relative to the rotary members arranged upstream from the flywheel, e.g. the torsion shaft.

In an aspect, the multiplier is arranged between the flywheel and the torsion shaft.

In addition to a power plant, the invention provides an aircraft that is remarkable in that it incorporates such a power plant. For example, the aircraft is a conventional rotorcraft fitted with a piston engine, with the flywheel, and with the torsion shaft as mentioned above taking the place of a turbine engine.

Finally, the invention provides a method of using a piston engine in a conventional power plant, in which method, the piston engine has a first row of pistons presenting an angle relative to a second row of pistons, the piston engine driving a conventional gearbox via transmission members having a torsion shaft and a flywheel in accordance with the power plant of the invention. During the method:

the torsion shaft driven by the pistons is dimensioned so as to be arranged between the first and second rows of pistons; and the flywheel is dimensioned as a function of the twisting stiffness of said torsion shaft in order to filter the torque pulsations generated by said piston engine.

The flywheel is thus dimensioned as a function of the dimensioning of the torsion shaft as imposed by the need to accommodate the piston engine in a small space.

BRIEF DESCRIPTION OF THE DRAWINGS

The invention and its advantages appear in greater detail from the context of the following description of embodiments given by way of illustration with reference to the accompanying figures, in which:

FIG. 1 is a diagram of an aircraft of the invention;

FIG. 2 is a diagrammatic cross-section showing the arrangement of a torsion shaft;

FIG. 3 is a diagram showing a variant of the invention; and

FIG. 4 is a diagram showing another variant of the invention.

DETAILED DESCRIPTION OF THE PREFERRED EMBODIMENTS

Elements that are present in more than one of the figures are given the same references in each of them.

FIG. 1 shows an aircraft 1 having a rotor 2, e.g. a rotary wing of a rotorcraft.

The aircraft 1 also has a power plant 10 suitable for setting the rotor 2 into motion. The power plant 10 then comprises a piston engine 30 and a conventional gearbox 20, i.e. a power transmission gearbox that is not specifically dimensioned to withstand the torque pulsations generated by a piston engine. The conventional gearbox 20 is arranged between the piston engine 30 and the rotor 2.

Conventionally, a piston engine comprises a plurality of pistons (not shown in FIG. 1) connected to a crank shaft 35. The crank shaft 35 then converts the movement in translation of the pistons into rotary movement.

Furthermore, the power plant 10 is provided with transmission members connecting the crank shaft 35 of the piston engine 30 to the gearbox 20. More precisely, the power plant 10 is provided with a torsion shaft 40 and a flywheel 50 that together filter the torque pulsations generated by the piston engine 30.

With reference to FIG. 2, the piston engine 30 has a first row 31 of pistons 33, each sliding in a cylinder of said first row 31, and a second row 32 of pistons 33, each sliding in a cylinder of said second row 32. The first and second rows 31 and 32 are spaced apart at an angle $\alpha$.

The torsion shaft 40 is then arranged between the first row 31 and the second row 32 in order to ensure the power plant is compact. The torsion shaft is then arranged in the space between the first and second rows 31 and 32.

In the example shown, the torsion shaft 40 is placed in a casing of the piston engine 30. Nevertheless, it will be understood that the torsion shaft could be situated outside said casing, while nevertheless remaining mechanically connected to the crank shaft 35. The torsion shaft is thus not necessarily an element of the piston engine 30.

In order to use a piston engine together with a conventional gearbox 20, it is thus possible initially to dimension a torsion shaft so as to arrange it between the first and second rows 31 and 32 of the piston engine.

The stiffness in twisting of the torsion shaft as dimensioned in this way is then determined.

Thereafter, a flywheel is dimensioned as a function of said stiffness so that the flywheel and the torsion shaft together filter the torque pulsations generated by the piston engine 30, a fraction of the torque pulsations being filtered by the torsion shaft and the remainder of the torque pulsations being filtered by the flywheel.

With reference to FIG. 1, the power plant may be provided with adjustment means 60 for adjusting the relative speed of rotation between a first speed of rotation V1 of the torsion shaft 40 and a second speed of rotation V2 of the flywheel 50. A particular function of the adjustment means is to maintain a second speed of rotation V2 that is faster than the first speed of rotation V1.

The adjustment means may then comprise a speed reducer 61 arranged upstream from the torsion shaft 40 in order to slow down the first speed of rotation V1.

Similarly, the adjustment means may comprise a speed multiplier 62 arranged upstream from the flywheel 50 in order to increase the second speed of rotation V2.

The reducer 61 and the multiplier 62 are obtained for example by means of gearwheels, in compliance with the known techniques that are usually used.

In the variant of FIG. 1, a reducer 61 is arranged between the torsion shaft 40 and the crank shaft 35, the reducer engaging both the torsion shaft 40 and the crank shaft 35. Furthermore, a multiplier 62 is arranged between the torsion shaft 40 and the flywheel 50, the multiplier 62 engaging both the torsion shaft 40 and the flywheel 50.

With reference to FIGS. 3 and 4, the flywheel 50 may be arranged upstream from the torsion shaft 40, unlike the variant of FIG. 1, which provides for arranging the flywheel 50 downstream from the torsion shaft 40.

In FIG. 3, if the power plant does not require adjustment means to be implemented, the flywheel 50 engages both the crank shaft 35 and the torsion shaft 40, with the torsion shaft 40 driving the gearbox 20.

Conversely, and with reference to FIG. 4, a reducer 61 may be arranged between the flywheel 50 and the torsion shaft 40. Similarly, a multiplier 62 may be arranged between the flywheel 50 and the crank shaft 35.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A power plant provided with a piston engine driving a conventional gearbox dimensioned for a turbine engine, and an aircraft rotor driven by said power plant, said piston engine having a first row of pistons presenting an angle ($\alpha$) with a second row of pistons to define a space therebetween, wherein the power plant includes a flywheel and a torsion shaft set into motion by said pistons to drive said conventional gearbox, said torsion shaft being arranged within the space between the first row of pistons and the second row of pistons, said torsion shaft driving the flywheel;

wherein the powerplant includes adjustment means for adjusting the relative speed of rotation between a first speed of rotation (V1) of said torsion shaft and a second speed of rotation (V2) of said flywheel;

wherein the adjustment means comprises a speed reducer arranged upstream from said torsion shaft, the speed reduced being mechanically engaged with a crank shaft of said piston engine and said torsion shaft;

wherein the adjustment means comprises a speed multiplier upstream from said flywheel to increase the speed V2 of the flywheel, the speed multiplier being mechanically engaged with said flywheel and said torsion shaft;

wherein the crankshaft and torsion shaft each comprise a longitudinal axis passing through the center of and extending along a length of each shaft; and wherein the longitudinal axes of the crankshaft and torsion shaft are parallel and both the crankshaft and torsion shaft extend between a first and a second end of said piston engine.

2. A rotorcraft power plant comprising:

a piston engine having a first end, a second end, and first and second rows of pistons placed in a V-configuration to define a space therebetween;

a crankshaft extending between the first and second ends of the engine, and driven by the first and second rows of pistons;

speed reducer gearing engaged with the crankshaft adjacent to the first end of the engine;

a torsion shaft engaged with the speed reducer gearing adjacent to the first end of the engine and driven by the crankshaft, the torsion shaft arranged within the space between the first and second rows of pistons to extend between the first and second ends of the engine;

speed multiplier gearing engaged with the torsion shaft adjacent to the second end of the engine;

a flywheel engaged with the speed multiplier gearing adjacent to the second end of the engine and driven by the torsion shaft; and a gearbox driven by the flywheel and extending away from the second end of the engine.

3. The rotorcraft power plant of claim 2 wherein said torsion shaft is dimensioned to filter a fraction of torque pulsations generated by said piston engine, and the flywheel is then dimensioned as a function of a twisting stiffness of said torsion shaft and positioned downstream of the torsion shaft in order to filter a remainder of torque pulsations generated by said piston engine.

4. The rotorcraft power plant of claim 2 wherein the speed multiplier gearing is configured to adjust the relative speed of rotation between a first speed of rotation (V1) of said torsion shaft and a second speed of rotation (V2) of said flywheel, wherein V2 is greater than V1.

5. The rotorcraft power plant of claim 4 wherein the crankshaft rotates at a third speed of rotation greater than V1.

6. The rotorcraft power plant of claim 2 wherein the gearbox is a power gearbox adapted for coupling with a turbine engine.

7. The rotorcraft power plant of claim 2 wherein the piston engine is a diesel engine.

8. The rotorcraft power plant of claim 2 further comprising a rotor driven by the gearbox.

9. The rotorcraft power plant of claim 2 wherein the speed reducer gearing comprises a first gearwheel connected to the crankshaft for rotation therewith and a second gearwheel connected to the torsion shaft for rotation therewith, the first gearwheel in meshed engagement with the second gearwheel.

10. The rotorcraft power plant of claim 2 wherein the speed multiplier gearing comprises a comprises a first gearwheel connected to the torsion shaft for rotation therewith and a second gearwheel connected to the flywheel for rotation therewith, the first gearwheel in meshed engagement with the second gearwheel.

* * * * *